US007742412B1

(12) United States Patent
Medina

(10) Patent No.: US 7,742,412 B1
(45) Date of Patent: Jun. 22, 2010

(54) METHOD AND APPARATUS FOR PREVENTING HEAD OF LINE BLOCKING IN AN ETHERNET SYSTEM

(75) Inventor: Eitan Medina, Ramat Hasharon (IL)

(73) Assignee: Marvell Israel (M.I.S.L.) Ltd., Yokneam (IL)

( * ) Notice: Subject to any disclaimer, the term of this patent is extended or adjusted under 35 U.S.C. 154(b) by 1666 days.

(21) Appl. No.: 10/955,892

(22) Filed: Sep. 29, 2004

(51) Int. Cl.
*H04L 12/26* (2006.01)

(52) U.S. Cl. .................. 370/231; 370/235; 370/254

(58) Field of Classification Search ............. 370/229, 370/230, 230.1, 231, 235, 237, 254, 463; 709/220, 221, 223, 224
See application file for complete search history.

(56) References Cited

U.S. PATENT DOCUMENTS

| | | | |
|---|---|---|---|
| 5,726,976 A * | 3/1998 | Thompson et al. .......... 370/229 |
| 5,790,891 A | 8/1998 | Solt et al. | |
| 5,809,557 A | 9/1998 | Shemla et al. | |
| 5,841,722 A | 11/1998 | Willenz | |
| 5,913,042 A | 6/1999 | Shemla et al. | |
| 5,923,660 A | 7/1999 | Shemla et al. | |
| 5,930,261 A | 7/1999 | Shemla et al. | |
| 5,999,981 A | 12/1999 | Willenz et al. | |
| 6,240,065 B1 | 5/2001 | Medina et al. | |
| 6,327,615 B1 * | 12/2001 | Kasper ................. 709/213 |
| 6,601,116 B1 | 7/2003 | Shemla et al. | |
| 6,628,613 B1 * | 9/2003 | Joung et al. ............. 370/230 |
| 6,678,278 B2 | 1/2004 | Medina et al. | |
| 6,738,838 B2 | 5/2004 | Shemla et al. | |
| 6,980,520 B1 * | 12/2005 | Erimli ................. 370/236 |
| 7,002,911 B1 * | 2/2006 | Linville et al. ........... 370/230 |
| 7,212,534 B2 * | 5/2007 | Kadambi et al. ........ 370/395.2 |
| 7,593,328 B2 * | 9/2009 | Yang et al. ............. 370/230 |

* cited by examiner

*Primary Examiner*—Pankaj Kumar
*Assistant Examiner*—Duc T Duong

(57) ABSTRACT

A method for preventing head of line blocking in an Ethernet system. In one embodiment, a network interface detects whether there is traffic flow congestion between the network interface and a data processing unit such as a CPU or other peripheral. If yes, the network interface communicates the congestion status to its attached Ethernet switch. In another aspect of the invention, the Ethernet switch then stops serving the congested port or queue, and informs a switch from which the traffic flow causing the congestion originates. In a further aspect, the originating switch then reduces bandwidth for the traffic flow causing the congestion. In a still further aspect, the originating switch can take the bandwidth that it acquired because of reducing the congesting traffic flow, and use it to increase bandwidth for other traffic flow.

26 Claims, 5 Drawing Sheets

METHOD AND APPARATUS FOR PREVENTING HEAD OF LINE BLOCKING IN AN ETHERNET SYSTEM

CROSS-REFERENCE TO RELATED APPLICATIONS

This application incorporates by reference a patent application filed on the same day as the present application, Ser. No. 10/955,893 and entitled Method and Apparatus for Preventing Head of Line Blocking among Ethernet Switches.

FIELD OF THE INVENTION

The present invention relates to networking, and more specifically to traffic flow control in Ethernet networks.

BACKGROUND OF THE INVENTION

FIG. 1 shows a block diagram of a conventional Ethernet switching system. As shown, the Ethernet system comprises backplane switches 101 and 102, communicating with each other via a trunk line 103. The Ethernet system also comprises a plurality of line cards, including line cards 104, 105, and 106. Each of the line cards includes a switch, such as a switch 1041 in the line card 104, a switch 1051 in the line card 105, and a switch 1061 in the line card 106. Each of the switches communicates with a backplane switch (either of backplane switches 101 or 102). As a result, the line cards communicate with each other through the switches 104, 105 and 106 and the backplane switches 101 and 102.

In the line card 104, CPUs 1042 and 1043 communicate with each other via a network interface 1045, the switch 1041, and a network interface 1044. In the line card 105, CPUs 1052 and 1053 communicate with each other via a network interface 1055, the switch 1051, and a network interface 1054. In the line card 106, CPUs 1062 and 1063 communicate with each other via a network interface 1065, the switch 1061, and a network interface 1064. A CPU and a network interface may be connected over a bus (e.g. a PCI Express bus), while other lines in the system are Ethernet connections.

It should be noted that the network interface functionality within blocks 1044, 1045, 1054, 1055, 1064 and 1065 may be implemented in any number of ways, whether as a chip, a portion of a chip, a card, or a portion of a card.

An Ethernet switch has information about its own ports, so that the switch can receive a packet and switch it over to the right port by examining the content of the packet and component information inside the switch.

A traffic flow may, for example, proceed from the CPU 1063 in the line card 106 to the CPU 1053 in the line card 105 via the switch 1061, the backplane switches 101 and 102, and the switch 1051. Other traffic flow may proceed from the CPU 1052 in the line card 105 to the CPU 1053 in the same line card via the switch 1051. If these two traffic flows try to exit the same egress port of the switch 1051, congestion can occur.

In the conventional Ethernet system, information passed between the network interface 1054 and the switch 1051 is traffic flow only. There is no information exchanged between the conventional switches indicating that there is congestion on a port or a specific receive queue of the network interface, and that certain packets are going to be dropped by the network interface because of the congestion. If there is congestion, a switch usually would just drop the packets. The problem of recovering the packet drops is then handled by higher level software running on both sides of the network, i.e., the transmitter and receiver, which detect dropped frames and request retransmission. The protocol that is usually used for this purpose is TCP/IP. The only standard way of avoiding drops would be to employ IEEE 802.3x flow control. However, that flow control causes blocking in the network. As a result, the slowest link would degrade the performance of the entire network.

Usually, a switch uses several priority queues on the ingress side of a network interface, employing a classification mechanism to decide how to classify packets on the link and which priority queue a packet should go to. The packet is then received by the network interface, which employs an independent classification mechanism in assigning the packets to a certain queue inside the CPU memory. The CPU provides the network interface with resources in the CPU memory. The network interface usually supports several DMA queues that take the packets received from the network, classify them into receiving DMA queues and put them in the CPU memory. Each DMA queue is serviced by the CPU with a certain amount of buffer memory which is managed dynamically by the CPU and the DMA as packets are being received and consumed by the CPU. The CPU allocates CPU time between the queues according to a predetermined policy. For example, queues of control data may have high priority, and thus other priority queues may get congested and their receiving (RX) DMAs will run out of buffer capacity, and will be forced to drop packets that keep coming from the network (i.e. from the switch). The switch does not know what the network interface and the CPU are going to do with the traffic flow from the switch.

For example, the switch 1051 has two input traffic flows: the first one is the one from the CPU 1063, and the second one is the one from the CPU 1052. As an example, the switch 1051 may send to a destination, e.g., the CPU 1053, a flow of data comprising 50% of the first traffic flow, and 50% of the second traffic flow under certain circumstances.

The destination of packets has an internal queuing mechanism. For example, there are two queues from the network interface 1054 to the CPU 1053: the first queue for the first traffic flow and the second queue for the second traffic flow. If the network interface 1054 then detects that the first queue is already filled up, the CPU 1053 cannot serve the first queue. The network interface 1054 then drops the next packet to the first queue.

In this case, the link between the switch 1051 and the network interface 1054 is used inefficiently because the switch does not know the status of the network interface queue. The switch 1051 continues to send 50% of the first traffic flow, although the network interface 1054 will just drop the packets anyway. At the same time, although the CPU 1053 can serve the second queue, the switch 1051 only sends 50% of the second traffic flow.

However, if the switch 1051 had known about the congestion, it could have sent more packets from the CPU 1052, and fewer packets from the CPU 1063. In addition, if the switch 1051 had informed the switch 1061 about the congestion, the switch 1061 could have employed a packet discard mechanism to remove the packets from the CPU 1063 at the outset, thus reducing the load on the entire switching system, and allowing traffic flow from the CPU 1052 to pass through with higher bandwidth.

However, conventional network interfaces do not communicate with their attached switches about queue status of the network interfaces. In addition, conventional Ethernet switches that are connected via standard Ethernet ports to each other do not communicate congestion information over the Ethernet link. The only such known mechanism is the disadvantageous 802.3x flow control mechanism. The prior solution has been to use a separate link 110 to communicate congestion information. However, that information had no relation to priority queues.

Therefore, it would be desirable to provide a method and apparatus for communicating the queue status of a network interface to its attached switch, and for communicating the queue status between switches.

SUMMARY OF THE INVENTION

One object of the present invention is to provide a method for preventing head of line blocking in an Ethernet system, using Ethernet protocol and media to communicate congestion information. In one embodiment, a network interface detects whether there is traffic flow congestion between the network interface and a data processing unit to which the network interface is connected, such as a CPU on the line card, a CPU connected to the line card, or a peripheral. If yes, the network interface communicates the congestion status to its attached Ethernet switch. The Ethernet switch then stops serving the congested port or queue.

Another object of the present invention is to provide a method for reducing a load on an Ethernet system. When a network interface communicates its congestion status to its attached Ethernet switch, the attached Ethernet switch informs a switch from which the traffic flow causing the congestion originates. The originating switch then reduces bandwidth for the traffic flow causing the congestion.

Another object of the present invention is to provide an Ethernet network interface, which can detect traffic flow congestion between the network interface and a data processing unit to which the network interface is connected, such as a CPU on the line card, a CPU connected to the line card, or a peripheral, and communicates the congestion status to its attached switch.

A further object of the present invention is to provide an Ethernet switch in which, when an Ethernet network interface communicates its congestion status to the Ethernet switch, the Ethernet switch can reduce bandwidth for traffic flow causing the congestion.

A further object of the present invention is to provide an Ethernet system, comprising a network interface which can detect traffic flow congestion between the/network interface and a data processing unit to which the network interface is connected, such as a CPU on the line card, a CPU connected to the line card, or other peripheral, and communicates the congestion status to its attached switch; and an Ethernet switch which can reduce bandwidth for traffic flow causing the congestion when receiving the congestion status from a network interface.

BRIEF DESCRIPTION OF THE DRAWINGS

Embodiments of the present invention are described herein with reference to the accompanying drawings, similar reference numbers being used to indicate functionally similar elements.

DETAILED DESCRIPTION OF EMBODIMENTS

Embodiments of the present invention are described herein with reference to the accompanying drawings, similar reference numbers being used to indicate functionally similar elements.

Figure 2:
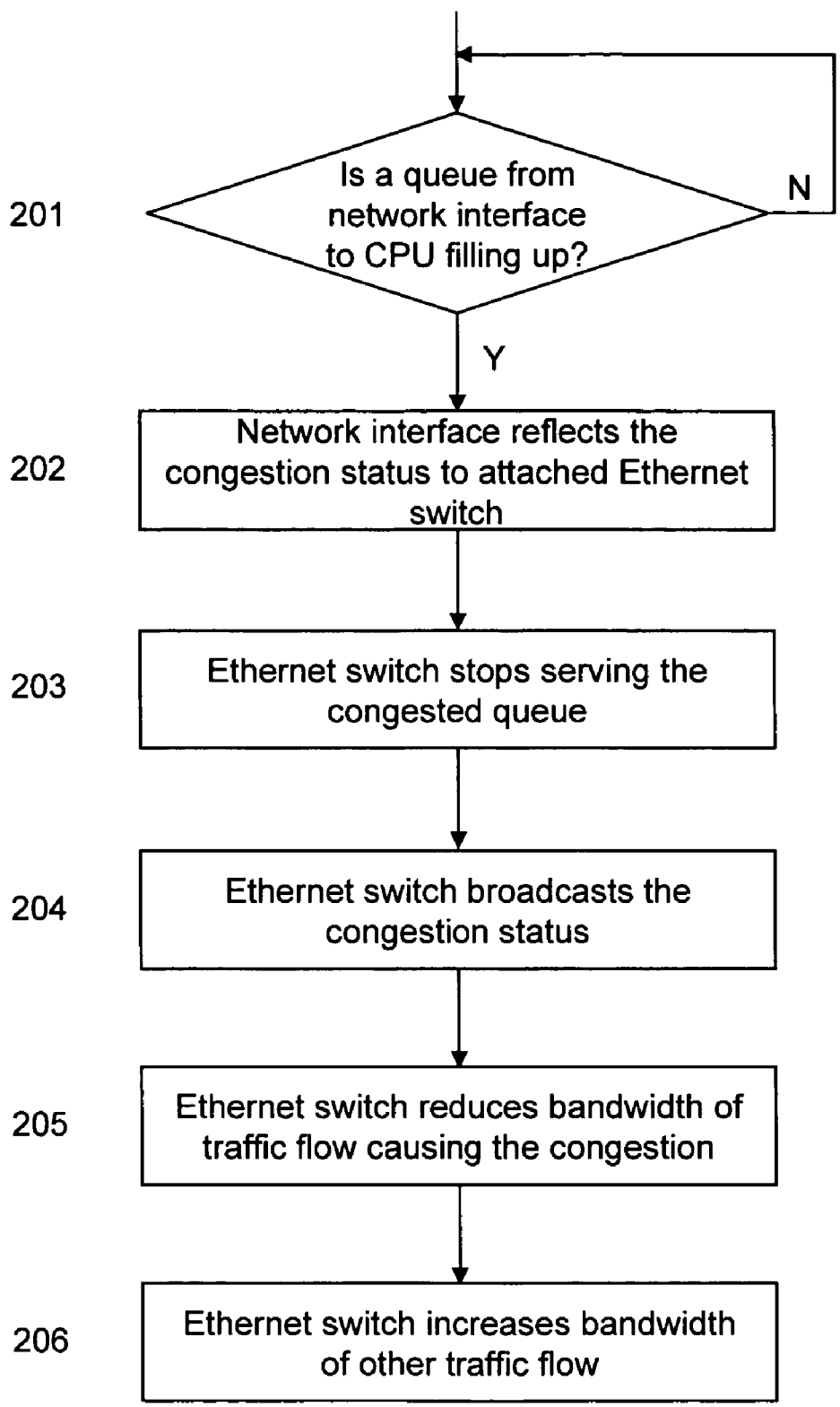
FIG. 2 shows a flow chart for method of traffic flow control in an Ethernet system according to one embodiment of the present invention.

FIG. 2 shows a flow chart for traffic flow control in an Ethernet system according to one embodiment of the present invention. In one embodiment of the present invention, the line card is a server blade, which has one or more CPU subsystems running application software, and communicating with other line cards using Ethernet. It should be understood that the network interface of the present invention is not limited to an adapter between user equipment and the Ethernet, but could be any interface between a packet destination and the Ethernet.

At step 201 in FIG. 2, the network interface 1054 detects that one or more of its queues, for example, its DMA queues to the CPU memory, start to fill up. At step 202, the network interface 1054 informs its attached switch, the switch 1051, about the congestion.

Figure 3:
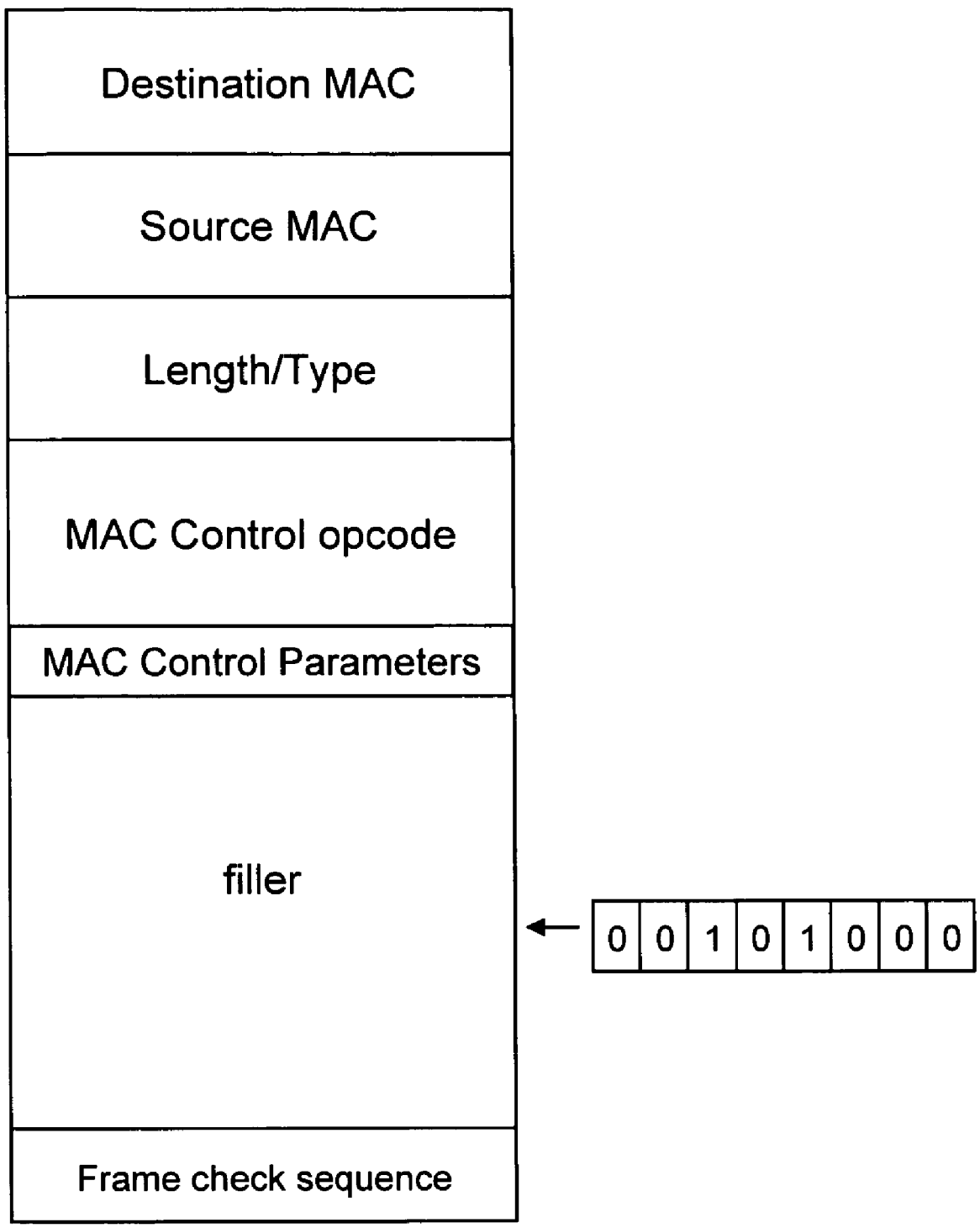
FIG. 3 shows a frame compliant with the IEEE 802.3x standard according to one embodiment of the present invention.

In one embodiment, the network interface 1054 communicates to its attached switch the network interface queue status. The network interface 1054 uses IEEE 802.3x compliant packets to reflect its queue status. A frame compliant with the IEEE 802.3x standard is shown in FIG. 3. As shown, the 802.3x compliant packet is a 64 byte packet that has a destination MAC address field, a source MAC address field, a field indicating the length and type of the frame, a field for MAC control opcode, a field for MAC control parameters, a filler, and a field for frame check sequence (FCS).

IEEE 802.3x defines reserved bits in the filler. In one embodiment of the present invention, the filler is used to send congestion information about priority queue or priority port. For example, the network interface 1054 sends 8 bits to a port of the switch 1051, where the first bit corresponds to a priority queue 0 and the last bit corresponds to a priority queue 7. Each bit represents status of one queue of the network interface at a moment. A value 0 means "do not send any more" and a value 1 means "continue to send". In another example, the bits correspond to priority port status.

Usually, an 802.3x compliant packet only defines two states, on and off, to control data flow. In one implementation, a timer with a value that indicates how much more data can be sent by a link partner is employed. A typical usage is binary indication of transmission allowance. However, as discussed above, in one embodiment of the present invention, the filler of a 802.3x compliant packet is filled with a bitmap, indicating status of priority queue or priority port. This can be extended to hold one timer per class as well. For example, the filler could contain multiple timers, one per class of traffic.

The network interface 1054 sends to the switch 1051 its queue status periodically, so that the traffic flows to these queues continue or stop for a certain period of time, until a new 802.3x packet with an updated bitmap is received. Thus, the 802.3x compliant packet of the present invention does not just inform the switch to send packets or not. Instead, it provides the switch with status of the network interface's priority queues on receiving, so that the switch can distribute its resource accordingly: reducing packets to congested queues, and increasing packets to other queues.

It should be understood that the network interface could inform its attached switch about the congestion in other ways, which the ordinarily skilled artisan will understand.

At step 203, the switch 1051 stops serving the congested queue. The congested queues start to fill up in the switch, and then depending on the switch, could eventually be dropped.

Figure 1:
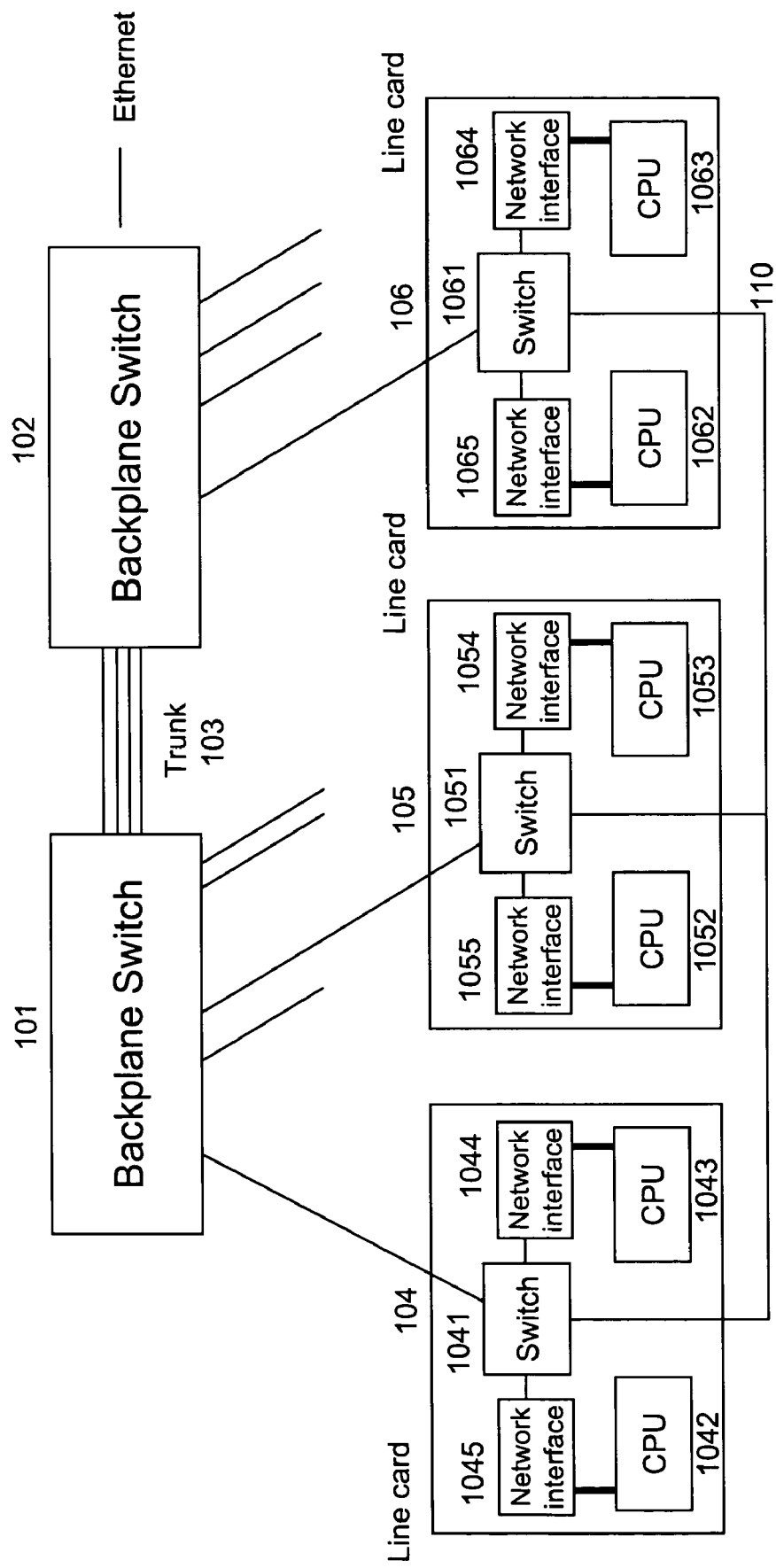
FIG. 1 shows a block diagram of a conventional Ethernet switching system.

In one embodiment, the present invention ends with step 203. In another embodiment, to further reduce the load on the Ethernet system, the originating switch of the congested queue could be informed to stop sending traffic flows. To do so, at step 204, the switch 1051 informs the originating switch of the congested queues, e.g., the switch 1061, about the congestion. The switch to switch notification could be done over a proprietary line, as shown in FIG. 1. The switch to switch notification could also be done over the Ethernet, as described in the concurrently filed application Ser. No. 10/955,893, and entitled Method and Apparatus for Preventing Head of Line Blocking among Ethernet Switches.

At step 205, the originating switch reduces the bandwidth of the traffic flow going to the congested queue.

According to yet another embodiment of the invention, at step 206, the originating switch could also increase the bandwidth of other traffic flows, to make better use of the switch's available bandwidth.

Figure 4:
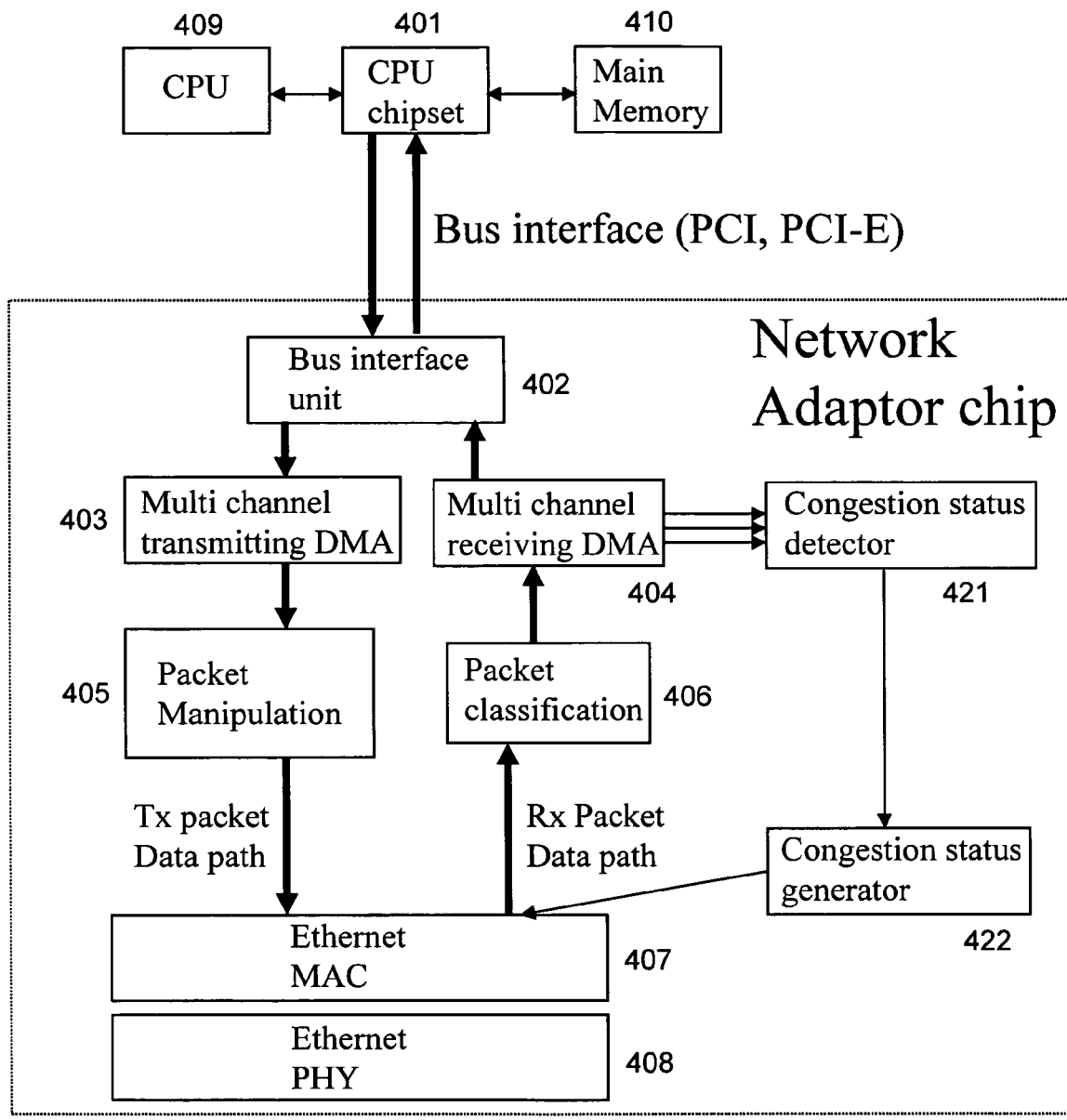
FIG. 4 shows a block diagram of a network interface according to one embodiment of the present invention.

FIG. 4 shows a block diagram of a network interface according to one embodiment of the present invention. As with conventional NICs, the network interface 400 comprises a bus interface unit 402, such as a PCI interface, communicating with a CPU chipset 401, which communicates with a CPU 409 and a CPU main memory 410; a multi-channel transmitting DMA 403; a multi-channel receiving DMA 404; a packet manipulation module 405; a packet classification module 406; the Ethernet MAC layer 407; and the Ethernet PHY layer 408. Additionally, the network interface 400 according to one embodiment of the present invention further comprises a congestion status detector 421 and a congestion status information generator 422. The congestion status detector 421 receives signals from the multi-channel receiving DMA 404, determines whether any queue is congested, and sends the congestion status information to the congestion status information generator 422. The congestion status information generator 422 generates a frame containing the queue status information, e.g., a 802.3x compliant frame containing a bitmap shown in FIG. 3, and sends the frame to the attached switch via the Ethernet MAC layer 407 and the Ethernet PHY layer 408. The multi-channel receiving DMA 404 knows the status of the main memory per each DMA channel. It should be understood that the congestion status detector 421 could be a part of the multi-channel receiving DMA 404, and the congestion status information generator 422 could be a part of the Ethernet MAC 407.

It should be understood that obtaining the queue status information from the multi-channel transmitting DMA 403 has a similar effect. In addition, a skilled artisan would appreciate that instead of queue status, the network interface could monitor its port status and communicate the port congestion status to the switch for the traffic flow control via a bitmap in an IEEE 802.3x compliant frame.

Figure 5:
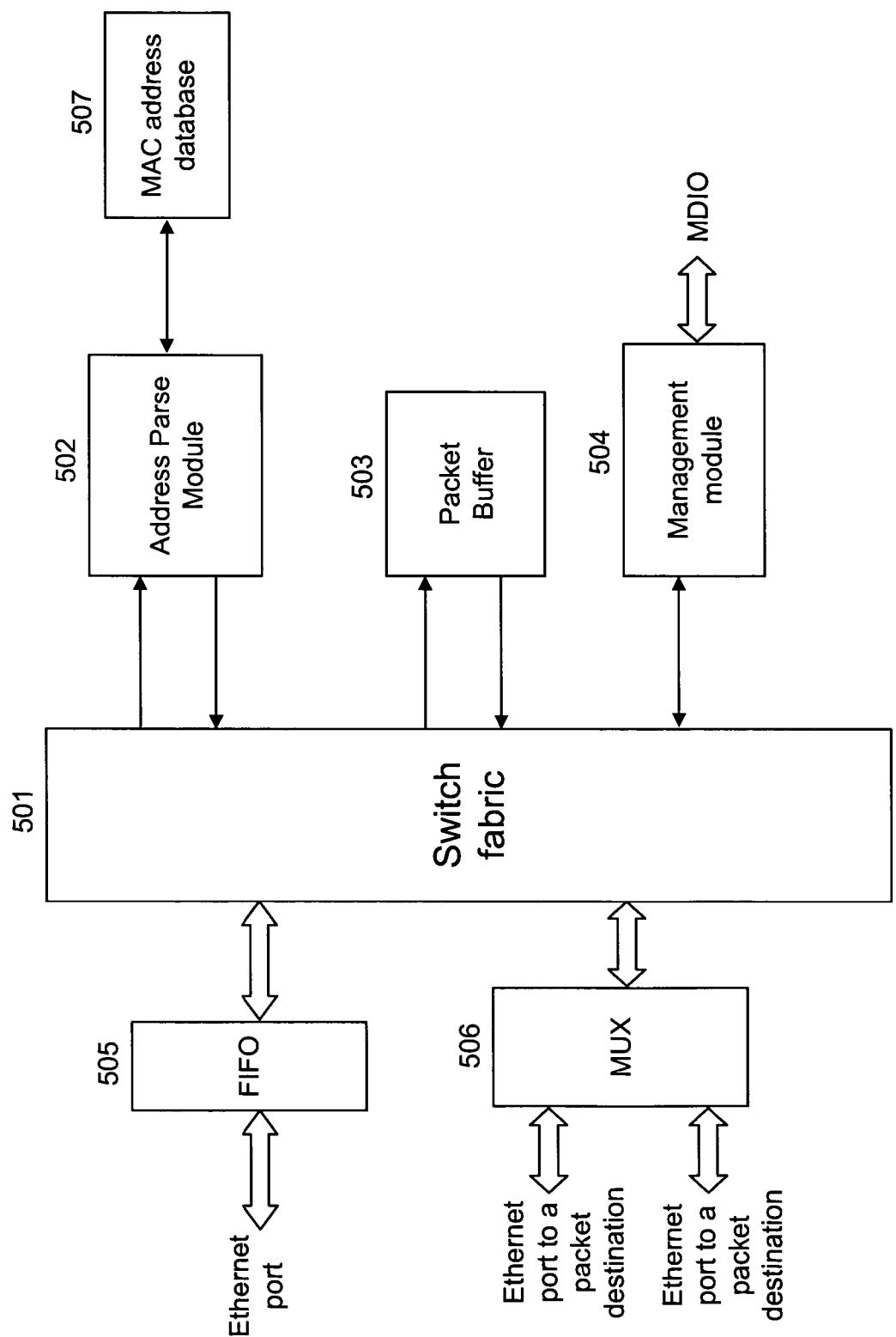
FIG. 5 shows a block diagram of an Ethernet switch according to one embodiment of the present invention.

FIG. 5 shows a block diagram of an Ethernet switch according to one embodiment of the present invention. The switch comprises switch fabric 501; an address parse module 502, a packet buffer module 503, a management module 504, a FIFO 505, and a multiplexer (MUX) 506, all of which communicate with the switch fabric 501. In addition, the management module 504 communicates with management data I/O (MDIO), and the address parse module 502 communicates with a MAC address database 507. The FIFO 505 communicates with the Ethernet port to the backplane switch, and the MUX 506 communicates with two Ethernet ports to end points.

The management module 504 could program mapping of the switch queues to the network interface queues. From the 802.3x frame from the network interface, the management module 504 decides the affected switch queues, and reduces bandwidths for these affected queues accordingly. In one embodiment, the management module 504 also could increase bandwidth for other queues.

While the invention has been described in detail above with reference to some embodiments, variations within the scope and spirit of the invention will be apparent to those of ordinary skill in the art. Thus, the invention should be considered as limited only by the scope of the appended claims.

What is claimed is:

1. An Ethernet network interface, comprising:
an interface unit to a data processing unit with which the network interface communicates;
a multi-channel transmitting direct memory access (DMA) receiving signals from the interface unit;
a multi-channel receiving DMA sending signals to the interface unit;
a packet manipulation module receiving signals from the multi-channel transmitting DMA;
a packet classification module sending signals to the multi-channel receiving DMA;
an Ethernet MAC layer receiving signals from the packet manipulation module and sending signals to the packet classification module;
an Ethernet PHY layer coupled to an Ethernet switch;
a congestion status detector for detecting whether there is traffic congestion between the network interface and the data processing unit; and
a congestion status information generator for generating an IEEE 802.3x compliant frame containing congestion status information for at least two different network interface traffic classes independently at substantially the same time, and sending the IEEE 802.3x compliant frame containing the congestion status information to the Ethernet switch.

2. The network interface according to claim 1, wherein the congestion status information is related to congestion on at least two queues of the network interface.

3. The network interface according to claim 2, wherein the congestion status information is related to congestion on at least two inbound queues of the network interface from the Ethernet switch.

4. The network interface according to claim 2, wherein the congestion status information is related to congestion on at least two outbound queues from the network interface to the data processing unit.

5. The network interface according to claim 1, wherein the congestion status information is related to congestion on at least two ports of the network interface.

6. The network interface according to claim 5, wherein the congestion status information is related to congestion on at least two egress ports of the network interface.

7. The network interface according to claim 5, where the congestion status information is related to congestion on at least two ingress ports of the network interface.

8. The network interface according to claim 1, wherein the reserved bits of the IEEE 802.3x compliant frame are used to carry a bitmap, and wherein at least two bits of the bitmap indicate congestion status of two network interface traffic classes independently at substantially the same time.

9. The network interface according to claim 8, wherein the bitmap comprises an 8-bit word, and each bit indicates congestion status of a network interface traffic class.

10. The network interface according to claim 9, wherein a bit value 0 means "do not send" and a bit value 1 means "continue to send."

11. The network interface according to claim 1, implemented in a network interface card (NIC).

12. The network interface according to claim 1, implemented in a semiconductor chip and associated software.

13. An Ethernet line card, comprising:
at least one network interface according to claim 1;
at least one CPU communicating data with the network interface; and
an Ethernet switch communicating between the network interface and the Ethernet.

14. Ethernet network interfacing means, comprising:
interface means for enabling the network interfacing means to communicate with a data processing means;
multi-channel transmitting direct memory access (DMA) means receiving signals from the interface;
multi-channel receiving DMA means sending signals the interface;
packet manipulation means receiving signals from the multi-channel transmitting DMA means;
packet classification means sending signals to the multi-channel receiving DMA means;
Ethernet MAC layer means receiving signals from the packet manipulation means and sending signals to the packet classification means;
Ethernet PHY layer means coupled to an Ethernet switch;
congestion status detecting means for detecting whether there is traffic congestion between the network interfacing means and the data processing means; and
congestion status information generating means for generating an IEEE 802.3x compliant frame containing congestion status information for at least two different network interfacing means traffic classes independently at substantially the same time, and sending the IEEE 802.3x compliant frame containing the congestion status information to the Ethernet switch.

15. The network interfacing means according to claim 14, wherein the congestion status information is related to congestion on at least two queues of the network interfacing means.

16. The network interfacing means according to claim 15, wherein the congestion status information is related to congestion on at least two inbound queues of the network interfacing means from the Ethernet switch.

17. The network interfacing means according to claim 15, wherein the congestion status information is related to congestion on at least two outbound queues from the network interfacing means to the data processing means.

18. The network interfacing means according to claim 14, wherein the congestion status information is related to congestion on at least two ports of the network interfacing means.

19. The network interfacing means according to claim 18, wherein the congestion status information is related to congestion on at least two egress ports of the network interfacing means.

20. The network interface according to claim 18, where the congestion status information is related to congestion on at least two ingress ports of the network interfacing means.

21. The network interfacing means according to claim 14, wherein the reserved bits of the IEEE 802.3x compliant frame are used to carry a bitmap, and wherein at least two bits of the bitmap indicate congestion status of two network interfacing means traffic classes independently at substantially the same time.

22. The network interfacing means according to claim 21, wherein the bitmap comprises an 8-bit word, and each bit indicates congestion status of a network interfacing means traffic class.

23. The network interfacing means according to claim 22, wherein a bit value 0 means "do not send" and a bit value 1 means "continue to send."

24. The network interfacing means according to claim 14, implemented in a network interface card (NIC).

25. The network interfacing means according to claim 14, implemented in a semiconductor chip and associated software.

26. An Ethernet line card, comprising:
at least one network interfacing means according to claim 14;
at least one CPU communicating data with the network interfacing means; and
an Ethernet switching means communicating between the network interfacing and the Ethernet.

* * * * *